United States Patent
Wu et al.

(10) Patent No.: US 10,789,497 B2
(45) Date of Patent: Sep. 29, 2020

(54) IMAGE CAPTURING DEVICE AND IMAGE CAPTURING METHOD FOR ALTERNATELY SWITCHING TWO LIGHT FILTERS

(71) Applicant: QISDA CORPORATION, Taoyuan (TW)

(72) Inventors: Po-Fu Wu, New Taipei (TW); Chi-Cheng Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 195 days.

(21) Appl. No.: 15/956,761

(22) Filed: Apr. 19, 2018

(65) Prior Publication Data
US 2018/0373948 A1 Dec. 27, 2018

(30) Foreign Application Priority Data
Jun. 22, 2017 (TW) .............................. 106120895 A

(51) Int. Cl.
*G06K 9/00* (2006.01)
*G06K 9/20* (2006.01)
(Continued)

(52) U.S. Cl.
CPC .......... *G06K 9/209* (2013.01); *G06K 9/00268* (2013.01); *G06K 9/00771* (2013.01);
(Continued)

(58) Field of Classification Search
CPC ........... G06K 9/00261; G06K 9/00268; G06K 9/00362; G06K 9/00369; G06K 9/00597; G06K 9/00604; G06K 9/00771; G06K 9/00778; G06K 9/00899; G06K 9/00906; G06K 9/20; G06K 9/2018; G06K 9/209; G06K 9/36; G06K 9/38; G06K 9/6288; G06K 9/6289; G06K 2209/21;
(Continued)

(56) References Cited

U.S. PATENT DOCUMENTS

| 10,051,211 B2 * | 8/2018 | Chen .................. H04N 5/23245 |
| 2002/0030755 A1 * | 3/2002 | Uchino ................ H04N 5/2254 348/342 |

(Continued)

FOREIGN PATENT DOCUMENTS

| CN | 105163014 A | 12/2015 |
| CN | 205485230 U | 8/2016 |

(Continued)

*Primary Examiner* — Eric Rush

(57) ABSTRACT

An image capturing device includes an image capturing unit, a light filter module, a light sensing unit, an infrared light source and a processing unit. The light filter module includes a first light filter and a second light filter. The first light filter filters an infrared and allows a visible light to pass. The second light filter filters a visible light and allows an infrared to pass. The light sensing unit senses an environmental light. When the processing unit determines that an intensity of the environmental light is higher than a threshold, the processing unit alternately switches the first light filter and the second light filter to a front of the image capturing unit, controls the image capturing unit to capture a visible light image through the first light filter, and controls the image capturing unit to capture an infrared image through the second light filter.

18 Claims, 2 Drawing Sheets

(51) Int. Cl.
   *H04N 5/232* (2006.01)
   *H04N 5/33* (2006.01)
   *G06K 9/38* (2006.01)
   *G06K 9/62* (2006.01)
   *H04N 5/225* (2006.01)
   *G02B 5/20* (2006.01)

(52) U.S. Cl.
   CPC ............. *G06K 9/20* (2013.01); *G06K 9/2018* (2013.01); *G06K 9/38* (2013.01); *G06K 9/6289* (2013.01); *H04N 5/2254* (2013.01); *H04N 5/232* (2013.01); *H04N 5/23245* (2013.01); *H04N 5/33* (2013.01); *H04N 5/332* (2013.01); *G02B 5/208* (2013.01); *G06K 2209/21* (2013.01); *G06T 2207/30232* (2013.01)

(58) Field of Classification Search
   CPC .......... G06T 2207/10048; G06T 2207/30232; G02B 5/208; H04N 5/2254; H04N 5/232; H04N 5/23245; H04N 5/33; H04N 5/332
   USPC ........ 382/100, 103, 115, 117, 118, 218, 254, 382/274, 284, 291, 307, 312, 325; 351/200, 206, 213, 216–218, 221, 246; 348/77, 78, 135, 143, 152, 154, 155, 161, 348/162, 164, 169, 222.1, 227.1, 342; 396/153
   See application file for complete search history.

(56) References Cited

U.S. PATENT DOCUMENTS

| | | | | |
|---|---|---|---|---|
| 2002/0136435 | A1* | 9/2002 | Prokoski | G06K 9/00221 382/118 |
| 2005/0105778 | A1* | 5/2005 | Sung | G06K 9/00255 382/115 |
| 2006/0187305 | A1 | 8/2006 | Trivedi | |
| 2006/0244583 | A1* | 11/2006 | Kawada | H04N 5/2254 340/468 |
| 2010/0141770 | A1* | 6/2010 | Gomi | G06K 9/00221 348/164 |
| 2012/0026325 | A1 | 2/2012 | Bunker | |
| 2012/0200734 | A1 | 8/2012 | Tang | |
| 2013/0265438 | A1* | 10/2013 | Sugiyama | H04N 5/33 348/164 |
| 2013/0342702 | A1* | 12/2013 | Zhang | G06K 9/00255 382/103 |
| 2014/0071293 | A1* | 3/2014 | Unnikrishnan | G06K 9/00221 348/164 |
| 2014/0099005 | A1* | 4/2014 | Mogi | G06K 9/00288 382/118 |
| 2014/0192206 | A1* | 7/2014 | Holz | H04N 5/23241 348/169 |
| 2014/0327837 | A1 | 11/2014 | Osterman | |
| 2014/0376773 | A1* | 12/2014 | Holz | G06K 9/00342 382/103 |
| 2016/0037049 | A1* | 2/2016 | Niida | H04N 5/23206 348/211.3 |
| 2017/0213096 | A1* | 7/2017 | Langley | G06K 9/00906 |
| 2017/0374282 | A1* | 12/2017 | Naruse | H04N 5/232 |
| 2018/0332207 | A1* | 11/2018 | Yamamoto | H04N 5/2354 |
| 2019/0068929 | A1* | 2/2019 | Sato | H04N 5/2353 |

FOREIGN PATENT DOCUMENTS

| | | |
|---|---|---|
| CN | 205750380 U | 11/2016 |
| CN | 106355169 A | 1/2017 |
| JP | H08223477 | 8/1996 |
| JP | 2000069463 | 3/2000 |

* cited by examiner

IMAGE CAPTURING DEVICE AND IMAGE CAPTURING METHOD FOR ALTERNATELY SWITCHING TWO LIGHT FILTERS

BACKGROUND OF THE INVENTION

1. Field of the Invention

The invention relates to an image capturing device and an image capturing method and, more particularly, to an image capturing device and an image capturing method for alternately switching two light filters when an environmental light is sufficient.

2. Description of the Prior Art

A conventional surveillance camera may be equipped with a filter switching mechanism in front of a lens, so as to switch a light filter A and a light filter B according to an intensity of an environmental light, wherein the light filter A filters an infrared and allows a visible light to pass, and the light filter B allows light with any wavelength to pass (including visible light and infrared). When the environmental light is sufficient, the prior art switches the light filter A to the front of the lens to capture a visible light image. Then, the visible light image is outputted to an image recognition software for analysis and determination. On the other hand, when the environmental light is insufficient, the prior art switches the light filter B to the front of the lens and switches on an infrared light source to capture an infrared image. Then, the infrared image is outputted to the image recognition software for analysis and determination.

In general, the image recognition software can compare variation between neighboring previous and next input images to determine whether there is an invader. When the environmental light is sufficient, the prior art uses the visible light image to perform image recognition. Accordingly, when a clothing color of the invader and a background color of an environment are identical or similar, it is difficult or impossible to recognize the difference between the invader and the background of the environment clearly, such that it is difficult or impossible to detect the invader in time.

SUMMARY OF THE INVENTION

An objective of the invention is to provide an image capturing device and an image capturing method for alternately switching two light filters when an environmental light is sufficient, so as to solve the aforesaid problems.

According to an embodiment of the invention, an image capturing device comprises an image capturing unit, a light filter module, a light sensing unit, an infrared light source and a processing unit. The light filter module is disposed adjacent to the image capturing unit. The light filter module comprises a first light filter and a second light filter. The first light filter filters an infrared and allows a visible light to pass. The second light filter filters a visible light and allows an infrared to pass. The light sensing unit senses an environmental light. The processing unit is electrically connected to the image capturing unit, the light filter module, the light sensing unit and the infrared light source. When the processing unit determines that an intensity of the environmental light is higher than a threshold, the processing unit alternately switches the first light filter and the second light filter to a front of the image capturing unit. When the first light filter is located in front of the image capturing unit, the processing unit controls the image capturing unit to capture a visible light image through the first light filter. When the second light filter is located in front of the image capturing unit, the processing unit controls the infrared light source to emit an infrared and controls the image capturing unit to capture an infrared image through the second light filter.

According to another embodiment of the invention, an image capturing method comprises steps of sensing an environmental light; determining whether an intensity of the environmental light is higher than a threshold; and when determining that the intensity of the environmental light is higher than the threshold, alternately switching a first light filter and a second light filter to a front of an image capturing unit; wherein the first light filter filters an infrared and allows a visible light to pass; when the first light filter is located in front of the image capturing unit, the image capturing method controls the image capturing unit to capture a visible light image through the first light filter; the second light filter filters a visible light and allows an infrared to pass; when the second light filter is located in front of the image capturing unit, the image capturing method controls an infrared light source to emit an infrared and controls the image capturing unit to capture an infrared image through the second light filter.

As mentioned in the above, when the invention determines that the intensity of the environmental light is higher than the threshold, it means that the environmental light is sufficient. At this time, the invention alternately switches the first light filter and the second light filter to the front of the image capturing unit. During the process of alternately switching the first light filter and the second light filter, the image capturing unit can capture the visible light image and the infrared image through the first light filter and the second light filter, respectively. When a color of an object (e.g. invader) in an environment and a background color of the environment are identical or similar, the invention can use the infrared image to assist in recognizing the difference between the object and the background of the environment, so as to enhance recognition for the object when the environmental light is sufficient. It should be noted that in addition to use neighboring previous and next images to recognize the difference, the invention may use single image to recognize face, object, license plate, or other specific information in the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
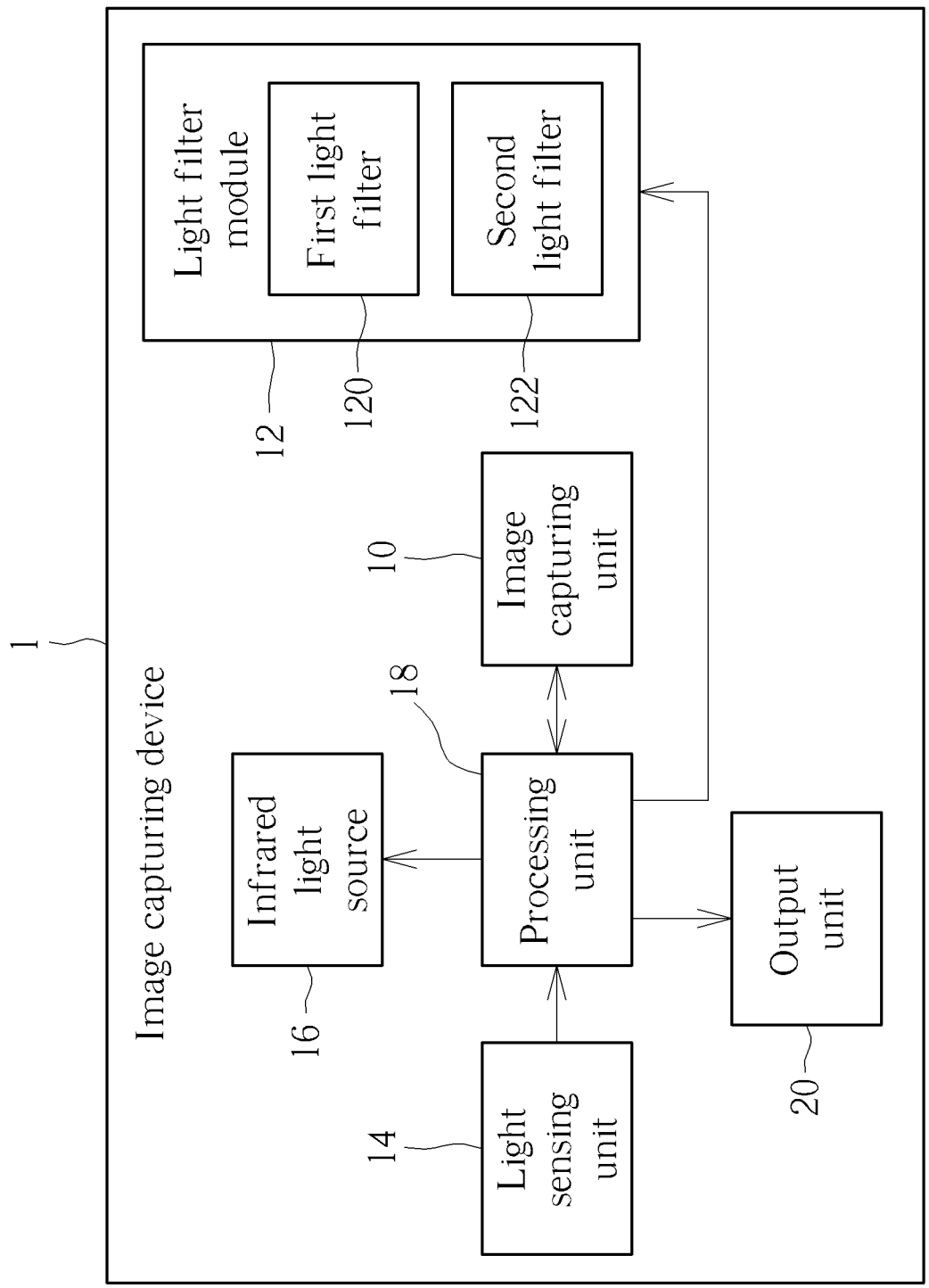
FIG. 1 is a functional block diagram illustrating an image capturing device according to an embodiment of the invention.

Referring to FIG. 1, FIG. 1 is a functional block diagram illustrating an image capturing device 1 according to an embodiment of the invention. As shown in FIG. 1, the image capturing device 1 comprising an image capturing unit 10, a light filter module 12, a light sensing unit 14, an infrared light source 16, a processing unit and an output unit 20, wherein the processing unit 18 is electrically connected to the image capturing unit 10, the light filter module 12, the light sensing unit 14, the infrared light source 16 and the output unit 20. In this embodiment, the image capturing device 1 may be a surveillance camera or other electronic devices with image capturing function; the image capturing unit 10 may be a charge-coupled device (CCD) sensor or a complementary metal-oxide semiconductor (CMOS) sensor; the light sensing unit 14 may be a light sensor; the processing unit 18 may be a processor or a controller with data calculating/processing function; the output unit 20 may be a display device, a speaker, a light source or a combination thereof. In general, the image capturing device 1 may be further equipped with some necessary hardware or software components for specific purposes, such as a memory, a circuit board, a power supply, applications, a communication module, a lens, etc., and it depends on practical applications.

The light filter module 12 is disposed adjacent to the image capturing unit 10. In this embodiment, the light filter module 12 comprises a first light filter 120 and a second light filter 122, wherein the first light filter 120 filters an infrared and allows a visible light to pass, and the second light filter 122 filters a visible light and allows an infrared to pass. The light sensing unit 14 senses an environmental light of an environment where the image capturing device 1 is located at. When the processing unit 18 determines that an intensity of the environmental light is higher than a threshold, it means that the environmental light is sufficient. At this time, the processing unit 18 alternately switches the first light filter 120 and the second light filter 122 to a front of the image capturing unit 10. In this embodiment, the light filter module 12 may be equipped with a filter switching mechanism (not shown), such that the processing unit 18 may control the filter switching mechanism to alternately switch the first light filter 120 and the second light filter 122 to the front of the image capturing unit 10.

In this embodiment, the first light filter 120 filters an infrared and allows a visible light to pass. Accordingly, when the first light filter 120 is located in front of the image capturing unit 10, the processing unit 18 can control the image capturing unit 10 to capture a visible light image through the first light filter 120. On the other hand, the second light filter 122 filters a visible light and allows an infrared to pass. Accordingly, when the second light filter 122 is located in front of the image capturing unit 10, the processing unit 18 can control the infrared light source 16 to emit an infrared and control the image capturing unit 10 to capture an infrared image through the second light filter 122.

After capturing the visible light image and the infrared image, the processing unit 18 may selectively analyze at least one of the visible light image and the infrared image. In this embodiment, the aforesaid image analysis may be image recognition and/or difference comparison. For example, the processing unit 18 may use an image recognition software to recognize face, object, license plate, or other specific information in the visible light image and/or the infrared image. Furthermore, the processing unit 18 may use an image recognition software to perform difference comparison by comparing neighboring previous and next visible light images or comparing neighboring previous and next infrared images.

When the environmental light is sufficient and a color of an object (e.g. invader) in the environment and a background color of the environment are identical or similar, it is difficult or impossible to recognize the difference between the object and the background of the environment clearly in the visible light image, such that it is difficult or impossible to detect whether there is a foreign body in the environment in time. At this time, the invention can use the infrared image to assist in recognizing the difference between the object and the background of the environment, so as to enhance recognition for the object when the environmental light is sufficient.

In another embodiment, after capturing the visible light image and the infrared image, the processing unit 18 may combine the visible light image and the infrared image to form a compound image and then analyze the compound image, so as to perform the aforesaid image recognition and/or difference comparison.

When the processing unit 18 determines that the intensity of the environmental light is higher than the threshold (i.e. the environmental light is sufficient), the processing unit 18 may alternately switch the first light filter 120 and the second light filter 122 to the front of the image capturing unit 10 by several manners depicted in the following.

First manner: the processing unit 18 may randomly and alternately switch the first light filter 120 and the second light filter 122 to the front of the image capturing unit 10.

Second manner: the processing unit 18 may alternately switch the first light filter 120 and the second light filter 122 to the front of the image capturing unit 10 by a predetermined time distribution. The aforesaid predetermined time distribution may be equal time distribution or unequal time distribution. The equal time distribution may be set to switch the first light filter 120 and the second light filter 122 every time period T (e.g. three seconds, five seconds, etc.). The unequal time distribution may be set to switch the second light filter 122 to the front of the image capturing unit 10 after switching the first light filter 120 to the front of the image capturing unit 10 for a time period T1 (e.g. three seconds) and switch the first light filter 120 to the front of the image capturing unit 10 after switching the second light filter 122 to the front of the image capturing unit 10 for another time period T2 (e.g. five seconds), wherein the time period T1 is different from the time period T2.

Third manner: the processing unit 18 may switch the first light filter 120 to the front of the image capturing unit 10 first and determine whether the visible light image conforms to a predetermined condition within a first predetermined time period (e.g. five seconds, ten seconds, etc.). When the processing unit 18 determines that the visible light image does not conform to the predetermined condition within the first predetermined time period, the processing unit 18 switches the second light filter 122 to the front of the image capturing unit 10 and determines whether the infrared image conforms to the predetermined condition within a second time period (e.g. five seconds, ten seconds, etc.). When the processing unit 18 determines that the infrared image does not conform to the predetermined condition within the second time period, the processing unit 18 switches the first light filter 120 to the front of the image capturing unit 10. The aforesaid predetermined condition may be that there is a difference between neighboring previous and next images or specific information (e.g. face, object, license plate, etc.) recognized from the image.

When the processing unit 18 determines that the intensity of the environmental light is lower than or equal to the threshold, it means that the environmental light is insufficient. At this time, the processing unit 18 will switch the second light filter 122 to the front of the image capturing unit 10, control the infrared light source 16 to emit an infrared, and control the image capturing unit 10 to capture an infrared image through the second light filter 122, so as to use the infrared image to perform the aforesaid image recognition and/or difference comparison.

In this embodiment, after capturing the visible light image and/or the infrared image, the processing unit 18 may control the output unit 20 to selectively display at least one of the visible light image and the infrared image for a user to watch. Furthermore, when the processing unit 18 determines that at least one of the visible light image and the infrared image conforms to a predetermined condition, the processing unit 18 may control the output unit 20 to output an alarm message, wherein the alarm message may be image, light, sound, or a combination thereof according to practical applications. The aforesaid predetermined condition may be that there is a difference between neighboring previous and next images or specific information (e.g. face, object, license plate, etc.) recognized from the image.

Figure 2:
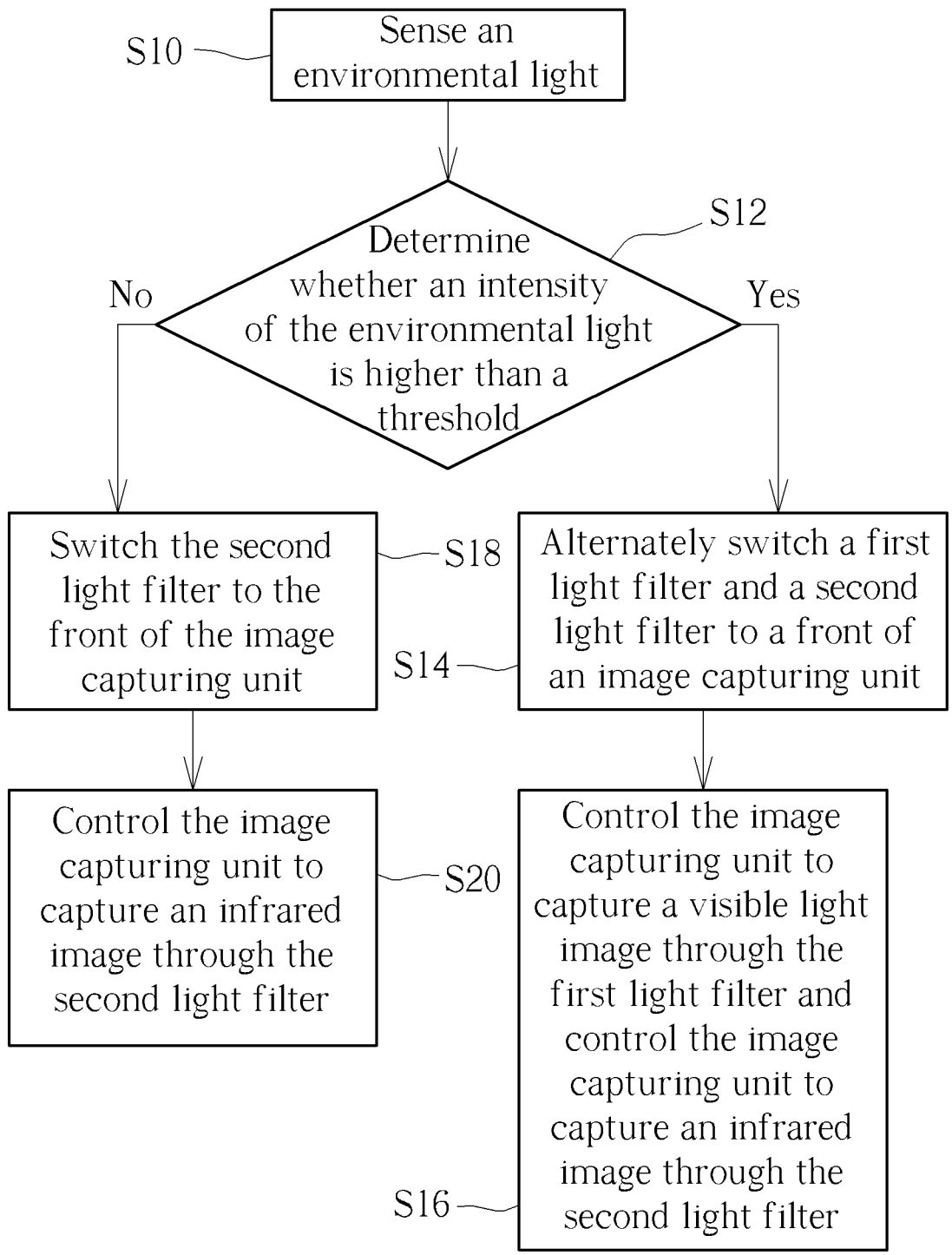
FIG. 2 is a flowchart illustrating an image capturing method according to an embodiment of the invention.

Referring to FIG. 2, FIG. 2 is a flowchart illustrating an image capturing method according to an embodiment of the invention. The image capturing method shown in FIG. 2 can be implemented by the image capturing device 1 shown in FIG. 1. First, step S10 is performed to sense an environmental light. Then, step S12 is performed to determine whether an intensity of the environmental light is higher than a threshold. When determining that the intensity of the environmental light is higher than the threshold, step S14 is performed to alternately switch a first light filter 120 and a second light filter 122 to a front of an image capturing unit 10. Then, step S16 is performed to control the image capturing unit 10 to capture a visible light image through the first light filter 120 and control the image capturing unit 10 to capture an infrared image through the second light filter 122. When determining that the intensity of the environmental light is lower than or equal to the threshold, step S18 is performed to switch the second light filter 122 to the front of the image capturing unit 10. Then, step S20 is performed to control the image capturing unit 10 to capture an infrared image through the second light filter 122. It should be noted that the detailed embodiments of the image capturing method of the invention are mentioned in the above and those will not be depicted herein again.

As mentioned in the above, when the invention determines that the intensity of the environmental light is higher than the threshold, it means that the environmental light is sufficient. At this time, the invention alternately switches the first light filter and the second light filter to the front of the image capturing unit. During the process of alternately switching the first light filter and the second light filter, the image capturing unit can capture the visible light image and the infrared image through the first light filter and the second light filter, respectively. When a color of an object (e.g. invader) in an environment and a background color of the environment are identical or similar, the invention can use the infrared image to assist in recognizing the difference between the object and the background of the environment, so as to enhance recognition for the object when the environmental light is sufficient. It should be noted that in addition to use neighboring previous and next images to recognize the difference, the invention may use single image to recognize face, object, license plate, or other specific information in the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device comprising:
   an image capturing unit;
   a light filter module disposed adjacent to the image capturing unit, the light filter module comprising a first light filter and a second light filter, the first light filter filtering infrared light and allowing visible light to pass, the second light filter filtering visible light and allowing infrared light to pass;
   a light sensor sensing an environmental light;
   an infrared light source; and
   a processing unit electrically connected to the image capturing unit, the light filter module, the light sensor and the infrared light source, when the processing unit determines that an intensity of the environmental light is higher than a threshold, the processing unit continuing to alternately switch the first light filter and the second light filter to a front of the image capturing unit until the intensity of the environmental light is lower than or equal to the threshold;
   wherein when the first light filter is located in front of the image capturing unit, the processing unit controls the image capturing unit to capture a visible light image through the first light filter; when the second light filter is located in front of the image capturing unit, the processing unit controls the infrared light source to emit infrared light and controls the image capturing unit to capture an infrared image through the second light filter.

2. The image capturing device of claim 1, wherein the processing unit selectively analyzes at least one of the visible light image and the infrared image.

3. The image capturing device of claim 1, wherein the processing unit combines the visible light image and the infrared image to form a compound image and analyzes the compound image.

4. The image capturing device of claim 1, wherein when the processing unit determines that the intensity of the environmental light is higher than the threshold, the processing unit randomly and alternately switches the first light filter and the second light filter to the front of the image capturing unit.

5. The image capturing device of claim 1, wherein when the processing unit determines that the intensity of the environmental light is higher than the threshold, the processing unit switches the first light filter to the front of the image capturing unit and determines whether the visible light image conforms to a predetermined condition within a first predetermined time period; when the processing unit determines that the visible light image does not conform to the predetermined condition within the first predetermined time period, the processing unit switches the second light filter to the front of the image capturing unit and determines whether the infrared image conforms to the predetermined condition within a second time period; when the processing unit determines that the infrared image does not conform to the predetermined condition within the second time period, the processing unit switches the first light filter to the front of the image capturing unit.

6. The image capturing device of claim 1, wherein when the processing unit determines that the intensity of the environmental light is higher than the threshold, the processing unit alternately switches the first light filter and the second light filter to the front of the image capturing unit by a predetermined time distribution.

7. The image capturing device of claim 1, wherein when the processing unit determines that the intensity of the environmental light is lower than or equal to the threshold, the processing unit switches the second light filter to the front of the image capturing unit.

8. The image capturing device of claim 1, further comprising an output unit electrically connected to the processing unit, the processing unit controlling the output unit to selectively display at least one of the visible light image and the infrared image.

9. The image capturing device of claim 1, further comprising an output unit electrically connected to the processing unit, wherein when the processing unit determines that at least one of the visible light image and the infrared image conforms to a predetermined condition, the processing unit controls the output unit to output an alarm message.

10. An image capturing method comprising steps of:
   sensing an environmental light;
   determining whether an intensity of the environmental light is higher than a threshold; and
   when determining that the intensity of the environmental light is higher than the threshold, continuing to alternately switch a first light filter and a second light filter to a front of an image capturing unit until the intensity of the environmental light is lower than or equal to the threshold;
   wherein the first light filter filters infrared light and allows visible light to pass; when the first light filter is located in front of the image capturing unit, the image capturing method controls the image capturing unit to capture a visible light image through the first light filter; the second light filter filters visible light and allows infrared light to pass; when the second light filter is located in front of the image capturing unit, the image capturing method controls an infrared light source to emit infrared light and controls the image capturing unit to capture an infrared image through the second light filter.

11. The image capturing method of claim 10, further comprising step of:
   selectively analyzing at least one of the visible light image and the infrared image.

12. The image capturing method of claim 10, further comprising step of:
   combining the visible light image and the infrared image to form a compound image and analyzing the compound image.

13. The image capturing method of claim 10, wherein the step of alternately switching comprises step of:
   randomly and alternately switching the first light filter and the second light filter to the front of the image capturing unit.

14. The image capturing method of claim 10, wherein the step of alternately switching comprises step of:
   switching the first light filter to the front of the image capturing unit and determining whether the visible light image conforms to a predetermined condition within a first predetermined time period;
   when determining that the visible light image does not conform to the predetermined condition within the first predetermined time period, switching the second light filter to the front of the image capturing unit and determining whether the infrared image conforms to the predetermined condition within a second time period; and
   when determining that the infrared image does not conform to the predetermined condition within the second time period, switching the first light filter to the front of the image capturing unit.

15. The image capturing method of claim 10, wherein the step of alternately switching comprises step of:
   alternately switching the first light filter and the second light filter to the front of the image capturing unit by a predetermined time distribution.

16. The image capturing method of claim 10, further comprising step of:
   when determining that the intensity of the environmental light is lower than or equal to the threshold, switching the second light filter to the front of the image capturing unit.

17. The image capturing method of claim 10, further comprising step of:
   selectively displaying at least one of the visible light image and the infrared image.

18. The image capturing method of claim 10, further comprising step of:
   when determining that at least one of the visible light image and the infrared image conforms to a predetermined condition, outputting an alarm message.

* * * * *